United States Patent [19]

Yamamoto et al.

[11] Patent Number: 4,897,201

[45] Date of Patent: Jan. 30, 1990

[54] COMPOSITION AND A PROCESS FOR PROMOTING DEWATERING OF GRANULATED SLAG

[75] Inventors: Akira Yamamoto, Suita; Yasutaka Arimoto, Neyagawa; Michio Konno, Oita, all of Japan

[73] Assignees: Katayama Chemical Works Co., Ltd., Osaka; Nippon Steel Corporation, Tokyo, both of Japan

[21] Appl. No.: 66,948

[22] Filed: Jun. 25, 1987

Related U.S. Application Data

[63] Continuation-in-part of Ser. No. 745,611, Jun. 17, 1985, abandoned.

[30] Foreign Application Priority Data

Jun. 23, 1984 [JP] Japan .................... 59-129644

[51] Int. Cl.⁴ .......................... B01D 21/00
[52] U.S. Cl. ..................... 210/729; 252/194; 252/60; 210/770; 210/728; 210/732; 210/778
[58] Field of Search ............ 252/194, 60; 210/770, 210/728, 729, 732, 778

[56] References Cited

U.S. PATENT DOCUMENTS

| | | |
|---|---|---|
| 3,515,214 | 6/1970 | Finch . |
| 3,525,414 | 6/1967 | Inamorato . |
| 4,039,466 | 8/1977 | Matsuda . |
| 4,210,531 | 7/1980 | Wang . |
| 4,264,457 | 4/1981 | Beeks . |
| 4,326,971 | 4/1982 | Wixon . |
| 4,338,204 | 7/1982 | Spadini . |
| 4,385,903 | 5/1983 | Moriyama . |
| 4,399,043 | 8/1983 | Keil . |
| 4,447,344 | 5/1984 | Roe . |

FOREIGN PATENT DOCUMENTS

| | | |
|---|---|---|
| 43477 | of 1977 | Japan . |
| 84708 | of 1982 | Japan . |
| 17816 | of 1983 | Japan . |
| 71994 | of 1983 | Japan . |

OTHER PUBLICATIONS

Derwent Abstract No. 85-059643; Japanese Document No. 60/016841 (Jan. 28, 1985).

*Primary Examiner*—John F. Terapane
*Assistant Examiner*—Gary Geist
*Attorney, Agent, or Firm*—Bryan, Cave, McPheeters & McRoberts

[57] ABSTRACT

A composition for promoting dewatering of granulated slag which comprises the combination of an anionic polyether sulfate surfactant with a cationic nitrogen-containing surfactant and optionally a defoaming agent, and a process for promoting dewatering of granulated slag using such composition, which are useful for preparing granulated slag having a moisture content of 4% or less as a material for cement.

11 Claims, 1 Drawing Sheet

COMPOSITION AND A PROCESS FOR PROMOTING DEWATERING OF GRANULATED SLAG

This is a continuation-in-part of U.S. application Ser. No. 745,611, filed June 17, 1985 now abandoned.

BACKGROUND OF THE INVENTION

1. Field of the Invention

The present invention relates to a composition and a process for promoting dewatering of granulated slag useful as a material for cement.

2. Description of the Prior Art

In the iron and steel industries, an enormous amount of slag is produced as a by-product. The so-called "granulated slag" having a latent hydraulic property, which is obtained by bringing the fused slag from the blast furnace into contact with water to quench and granulate it, is important e.g., as a material for cement. To utilize granulated slag as a material for cement, it is necessary to dry and pulverize the granulated slag. When the moisture content of granulated slag becomes 4% or less, the slag is dried by generation of heat on pulverizing and so, further drying is not necessary.

As regards drying of granulated slag, a process of spreading wet granulated slag on the ground thinly to dry in the sun is known. Such a process, however, requires a large area of ground for the drying of an enormous amount of slag and accordingly is not applicable in practice. What happens in practice is that the major portion of granulated slag is heaped up in the fields while it is still wet, allowed to dry spontaneously in the form of a thick heap, transported in the condition of having a moisture content of approximately 8–10%, and dried further by heating during cement manufacture or the like.

In this regard, a drying process utilizing the heat source in iron foundries has been proposed recently. However, this process has a defect that it requires a huge device for drying and high costs, since granulated slag having a strong affinity for water requires a large amount of heat for drying and the amount of slag to be dried is enormous.

The present invention is one which has been made after investigation to improve upon the state of art by treating granulated slag with a suitable agent.

In Japanese Patent Publication Gazette No. Sho 52(1977)-43477 (which corresponds to U.S. Pat No. 4,039,466), there is disclosed an invention pertaining to "A dewatering agent for wet, fine ores which consists essentially of (A) a nonionic surfactant having a polyoxyalkylene chain in its molecule and a cloud point of 35° C. or less and (B) an anionic surfactant having a hydrophobic polyoxyalkylene chain in its molecule, said chain consisting mainly of a hydrophobic oxyalkylene group (that is, an oxyalkylene group except $-CH_2-CH_2-O-$)". In the same Gazette, there is given a description to the effect that anionic surfactants such as sodium alkylbenzenesulfonate, dioctyl sodium sulfosuccinate, etc. are said to be effective for dewatering of pulverized coal, dripping of quartz sand, and the like. However, there is no description given which suggests that the dewatering agent may be utilized for dewatering of granulated slag which is not an ore but an inorganic solid prepared artificially and having a latent hydraulic property.

In Japanese Patent Laid-open Gazette No. Sho 57(1982)-84708, there is disclosed an agent for aiding dewatering on filtration of an aqueous slurry of a metal hydroxide insoluble or slightly soluble in water, which comprises an anionic surfactant represented by the general formula $R-O-(AO)_n-SO_3M$ (in which R denotes an alkyl or alkenyl group of $C_{8-C24}$, A denotes an alkylene group of $C_{2-4}$, and n is an integer of 1–100). However, neither description nor suggestion is given in the Gazette as to what effect will be attained when the said agent for aiding dewatering on filtration is applied to other ore, such as a complex of plural metal oxides, or the like.

Generally, slag comprises CaO and $SiO_2$ as the major ingredients, and blast-furnace slag contains $Al_2O_3$, MgO, etc. besides the major ingredients. These oxides do not exist in the slag in the form of free individual oxides, but they are combined with one another. For example, CaO and $SiO_2$ form calcium silicate compounds. Therefore, even when slag is brought into contact with water, it does not happen that the slag is converted by reaction with water into a mixture comprising mainly $Ca(OH)_2$.

In U.S. Pat. No. 4,210,531, there is disclosed an invention pertaining to a process for dewatering mineral concentrates which comprises first treating an aqueous slurry of a mineral concentrate with a polyacrylamide flocculant, next mixing a composition containing an anionic surfactant (such as dialkyl sulfosuccinate) with the slurry, and then removing water from the slurry. However, no description is found in the specification that suggests that the composition is useful for dewatering of granulated slag which is an inorganic solid prepared artificially and having latent hydraulic property.

In U.S. Pat. No. 4,447,344, there is disclosed an invention pertaining to a composition for promoting dewatering of an aqueous slurry of a particulate mineral, containing a specific nonionic surfactant and a hydrotrope, and a method of dewatering a wet, particulate mineral using the composition. Although it is described in this specification to use those compounds in which a sulfonate group is bound to a monovalent hydrocarbon residue of $C_{8-9}$ as the hydrotrope, such compounds are too hydrophilic to fall under the category of surface active agents. Moreover, there is no description given in the specification that suggests that the composition is useful for dewatering of granulated slag which is an inorganic solid prepared artificially and having a latent hydraulic property.

Under such circumstances, the inventors of the present initially found that various cationic surfactants and anionic surfactant exhibit a remarkable effect of promoting dewatering of wet, granulated slag.

However, it was difficult to apply such cationic or anionic surfactant actually to granulated slag as an agent for promoting its dewatering because of its foaming property or tendency.

Granulated slag produced in the form of slurry by granulating and quenching slag with pressurized water is usually filtered through wire mesh or the like, and the granulated slag collected is heaped up. The water separated by filtration is usually recycled as the pressurized water for crushing slag. Therefore, it was thought to perform the treatment with surfactants by adding a solution of the surfactant to the slurry before the filtration or by scattering a solution of the surface active agents over the granulated slag collected and heaped.

However, in the former case wherein a solution of surfactants was added to the slurry, the surfactants were introduced into the water-circulating system and caused such trouble that considerable foaming arose in the system, especially near the circulating pump, and recycle of the crushing water became impossible. Trouble due to the foaming arose also outside the circulating system.

On the other hand, in the latter case wherein a solution of surfactants was scattered over the heap of granulated slag, foaming arose a solution of scattering of surfactants was prepared from a concentrated solution of surfactants by dilution and stirring, and moreover the solution for scattering could not be transferred because foaming arose in the course transfer, especially near the transferring pump.

Further, "cavitation" occurred because of foaming at the transferring pumps resulted in lowering the life of the pumps.

Furthermore it was difficult to suppress such foaming substantially and permanently even when a defoaming agent was used in as large an amount as the concentration of the surfactants used.

Thus, the cationic or anionic surfactants could not be used practically on an industrial scale.

Nevertheless, it has been now found that, by using the above cationic surfactants and the anionic surfactants in combination, the possible foaming can be suppressed to a sufficient degree to allow their practical use on an industrial scale, without impeding the remarkable effect of promoting dewatering. The present invention has be made on the basis of such fact.

The composition and the process of the present invention enable one to prepare a granulated slag for blast-furnace cement, having a moisture content of 4% or less, from wet, granulated slag, without the need for any drying by heating. Since the granulated slag is a residue from a blast-furnace or a converter, it is not desirable to effect any treatment by heating, which is costly, for processing it into a product. Thus, the present invention is very useful one.

SUMMARY OF THE INVENTION

The present invention provides a granulated slag dewatering composition for promoting dewatering of granulated slag, which composition comprises an ionic surfactant component, said component consisting essentially of (a) one or more of anionic surfactants selected from the group consisting of those represented by the general formula $$RO+CH_2CH_2O)_{\overline{n}}SO_3M \quad (I)$$

$$RCON+CH_2CH_2O)_{\overline{n}}SO_3M, \text{ and} \quad (II)$$
$$\quad |$$
$$\quad R'$$

$$RCOOCH_2O+CH_2CH_2O)_{\overline{n}}SO_3M \quad (III)$$

wherein R denotes a monovalent hydrocarbon radical of $C_{11-30}$, R' denotes a hydrogen atom or a monovalent hydrocarbon radical of $C_{1-7}$, M denotes an inorganic cation of $H^+$, $NA^+$, $K^+$, $NH_4^+$, $\frac{1}{2} Mg^{2+}$ or $\frac{1}{2} Ca^{2+}$ and the mean value of n is 3-20, and (b) one or more of cationic surfactants selected from the group consisting of free bases represented by the general formula $$R-X \quad (IV)$$

and their acid-addition salts, and compounds containing a quaternary nitrogen atom represented by the general formula $$(R-Y)^+G^- \quad (V)$$

wherein R denotes a monovalent hydrocarbon radical of $C_{11-30}$, X denotes:

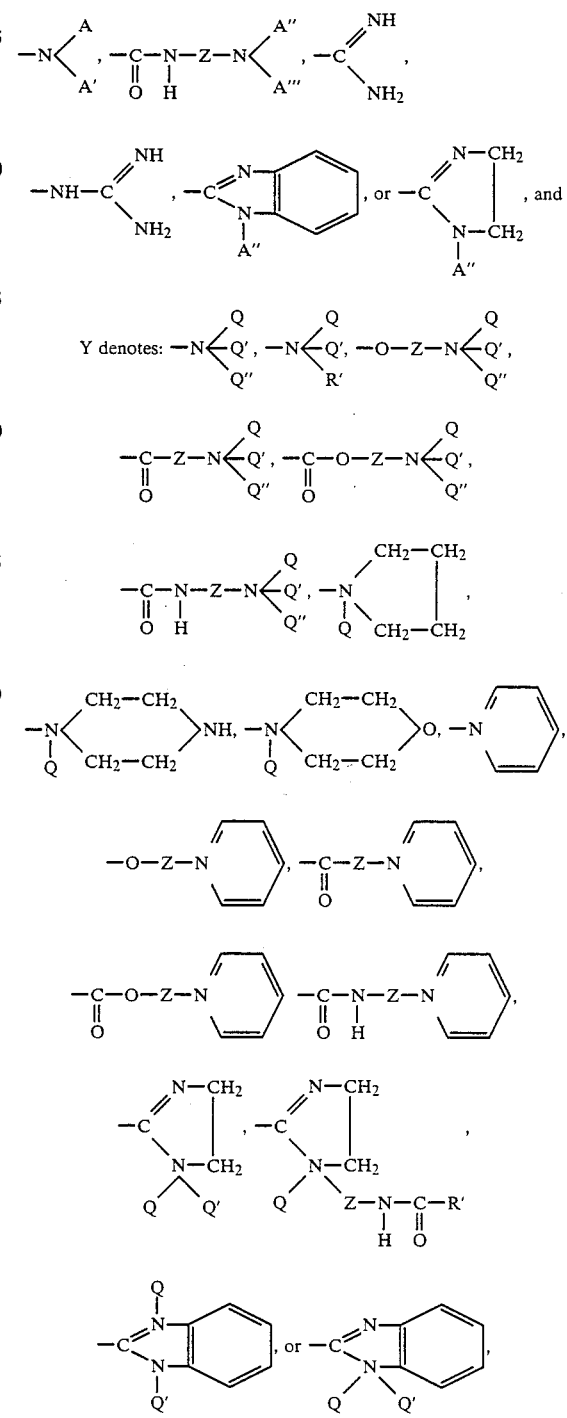

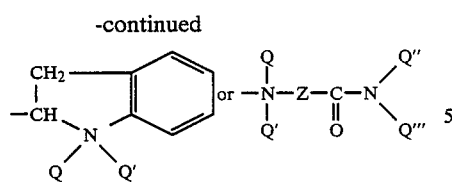

wherein A and A' may be identical with or different from each other and each denotes a hydrogen atom or a hydroxyalkyl group of $C_{1-4}$, A'' and A''' may be identical to or different from each other and each denotes a hydrogen atom, a monovalent hydrocarbon radical of $C_{1-7}$, or a hydroxyalkyl group of $C_{1-4}$, Q, Q', Q'' and Q''' may be identical with one another or not and each denotes a monovalent hydrocarbon radical of $C_{1-7}$ or a hydroxyalkyl group of $C_{1-4}$, R' denotes a monovalent hydrocarbon radical of $C_{1-30}$ which may be identical with or different from R, Z and Z' each denotes a divalent hydrocarbon radical of $C_{1-7}$ and may be identical with or different from each other, and G denotes a monovalent anion, said anionic surfactant(s) being compounded with said cationic surfactant(s) in a ratio of 79–50% by weight to 21–50% by weight.

The present invention also provides a process for promoting dewatering of granulated slag which comprises treating wet, granulated slag with the granulated slag dewatering composition as defined above in an aqueous medium under a neutral or alkaline condition of a pH 7 or higher.

DESCRIPTION OF THE PREFERRED EMBODIMENTS

Figure 1:
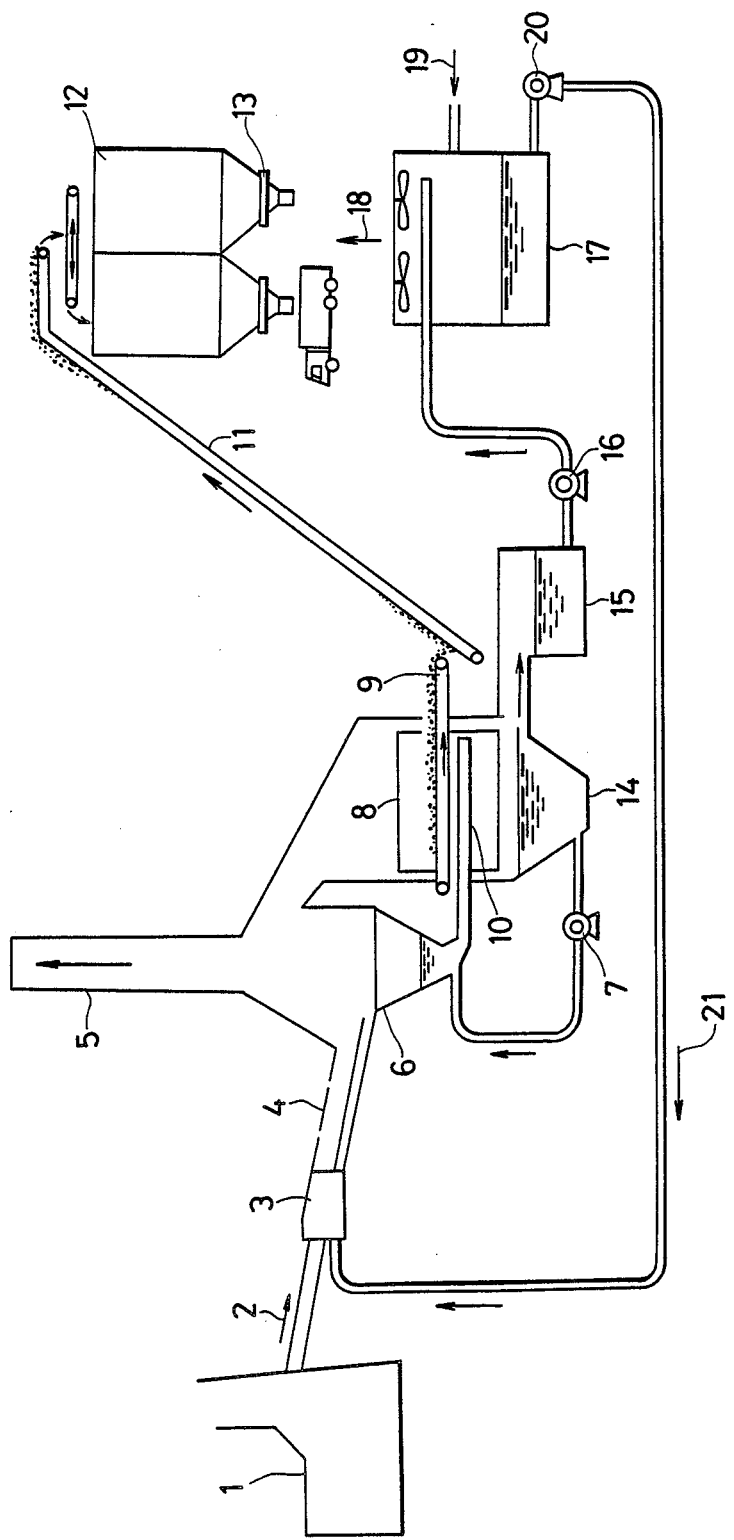
FIG. 1 shows a schematic diagram of slag granulation system used in Example 8.

The anionic surfactant used in the present invention is selected from the group consisting of those represented by the following general formulae (I)–(III):

(I)

(such as polyoxyethylene alkyl ether sulfate, polyoxyethylene alkylphenyl ether sulfate)

(II)

(such as sulfate of a polyethoxylated product of an amide of a fatty acid and $HOCH_2CH_2NH_2$)

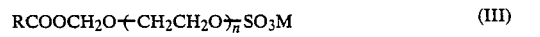
(III)

(such as sulfate of a condensation product of a fatty acid, formaldehyde and triethylene glycol) wherein R', M and n are as defined above.

More specifically, $C_{12}H_{25}O(CH_2CH_2O)_3SO_3Na$ and $C_{16}H_{33}O(CH_2CH_2O)_6SO_3Na$ of the general formula (I), $C_{11}H_{23}CONH(CH_2CH_2O)_4SO_3Na$ and $C_{17}H_{35}CONH(CH_2CH_2O)_8SO_3Na$ of the general formula (II), and $C_{11}H_{23}COOCH_2O(CH_2CH_2O)_3SO_3Na$ of the general formula (III) are mentioned as examples of the anionic surfactants.

The cationic surfactant used in the present invention is selected from the group consisting of free bases represented by the general formula

(IV)

and their acid-addition salts, and compounds containing quaternary nitrogen atom represented by the general formula

(V), wherein R denotes a monovalent hydrocarbon residue of $C_{11-30}$, X denotes

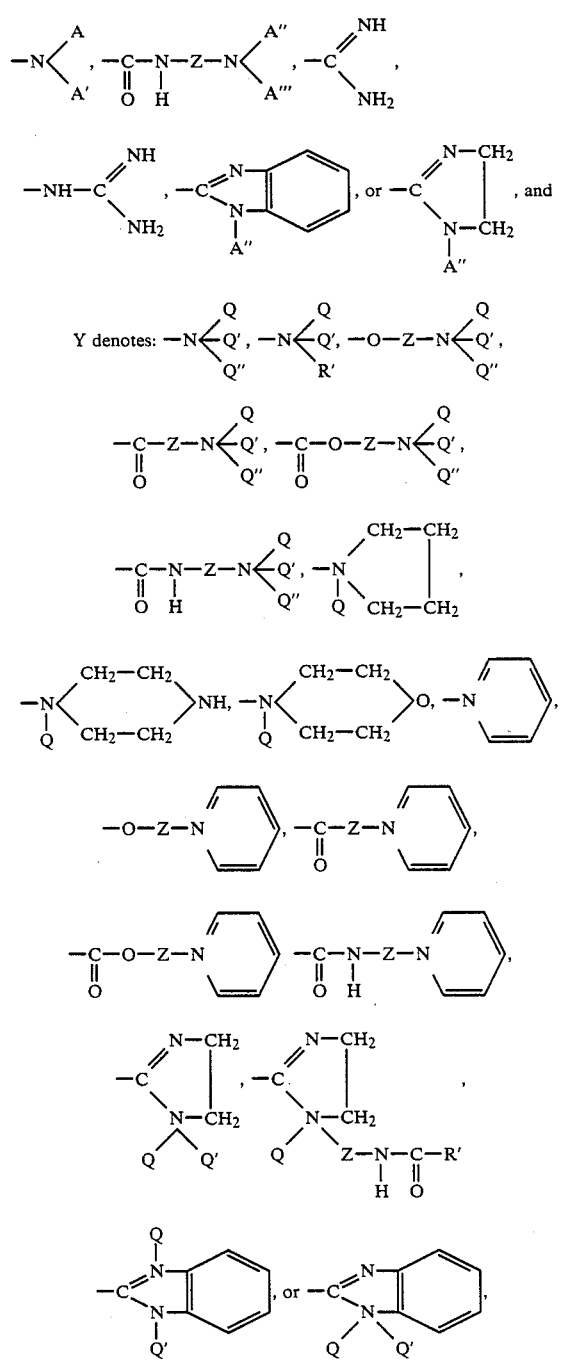

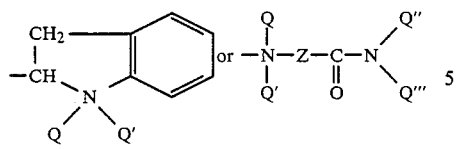 5 wherein A and A' may be identical with or different from each other and each denotes a hydrogen atom or a hydroxyalkyl group of $C_{1-4}$, A" and A''' may be identical to or different from each other and each denotes a hydrogen atom, a monovalent hydrocarbon radical of $C_{1-7}$, or a hydroxyalkyl group of $C_{1-4}$, Q, Q', Q" and Q''' may be identical with one another or not and each denotes a monovalent hydrocarbon radical of $C_{1-7}$ or a hydroxyalkyl group of $C_{1-4}$, R' denotes a monovalent hydrocarbon radical of $C_{1-30}$ which may be identical with or different from R, Z and Z' each denotes a divalent hydrocarbon radical of $C_{1-7}$ and may be identical with or different from each other, and G denotes a monovalent anion. The compounds represented by the above general formula (IV) are explained more specifically, hereinafter: Compounds of the general formula

 (1)

wherein R denotes, for example, an aliphatic hydrocarbon radical, an alicyclic hydrocarbon radical substituted by alkyl group(s), an aralkyl group or the like, and A and A' each denotes, for example, a hydrogen atom or a hydroxyalkyl group, as represented by aliphatic primary amines such as stearyl amine, oleyl amine, N-hydroxyethyl-oleyl amine, etc.; compounds of the general formula

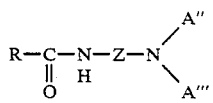 (2)

wherein R denotes, for example, an aliphatic hydrocarbon radical, an alicyclic hydrocarbon radical substituted by alkyl group(s), an aralkyl group or the like, Z denotes, for example, $-C_2H_4-$, $-C_3H_6-$ or the like, and A" and A''' each denotes, for example, a hydrogen atom, $-C_2H_4OH$ or the like, such as

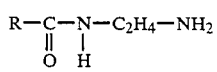

(in which R is a hydrocarbon radical of naphthenic acid or a fatty acid); compounds of the general formula

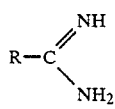 (3)

wherein R denotes, for example, an aliphatic hydrocarbon radical, an alicyclic hydrocarbon radical substituted by alkyl group(s), an aralkyl group or the like, such as stearoamidine; compounds of the general formula

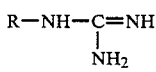 (4)

wherein R denotes, for example, an aliphatic hydrocarbon radical, as represented by alkylguanidine; compounds of the general formula

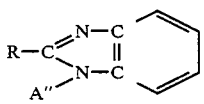 (5)

wherein R denotes, for example, an aliphatic hydrocarbon radical, and A" denotes, for example, $-CH_3$, $-C_2H_5$ or the like; and compounds of the general formula

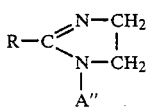 (6)

wherein R denotes, for example, an aliphatic hydrocarbon radical, an alicyclic hydrocarbon radical substituted by alkyl group(s), an aralkyl group, an alkylphenyl group or the like and A" denotes, for example, $-CH_3$, $-C_2H_5$, $-C_2H_4OH$ or the like, as represented by those compounds in which R is a hydrocarbon radical of naphthenic acid or a fatty acid and A" is $-C_2H_4OH$, such as 1-hydroxyethyl-2-heptadecenyl-2-imidazoline, are mentioned as examples of the compounds represented by the general formula (IV).

Further, the compounds represented by the above general formula (V) are explained concretely, hereinafter.

Compounds of the general formula

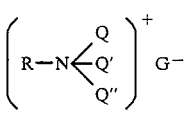 (7)

wherein R denotes, for example, an aliphatic hydrocarbon radical, an alicyclic hydrocarbon radical substituted by alkyl group(s), an aralkyl group, an alkylphenyl group or the like, and Q, Q' and Q" each denotes, for example, $-CH_3$, $-C_2H_5$, $-C_6H_5$, $-CH_2C_6H_5$, $-C_2H_4OH$ or the like, such as stearyl trimethyl ammonium, cetyl triethyl ammonium, lauryl dimethyl benzyl ammonium and the like; compounds of the general formula

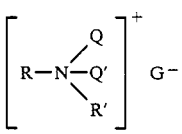 (8)

wherein R and R' each denotes, for example, an aliphatic hydrocarbon radical, an alicyclic hydrocarbon radical substituted by alkyl group(s), an aralkyl group, an alkylphenyl group or the like, and Q and Q' each denotes, for example, —CH₃, —C₂H₅, —C₆H₅, —CH₂—C₆H₅, —C₂H₄OH or the like, such as dilauryl dimethyl ammonium; compounds of the general formula

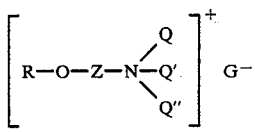

wherein R denotes, for example, an aliphatic hydrocarbon radical, an alicyclic hydrocarbon radical substituted by alkyl group(s), an aralkyl group, an alkylphenyl group or the like, Z denotes, for example, —CH₂—, and Q, Q' and Q'' each denotes, for example, —CH₃, —C₂H₅, —C₆H₆, —CH₂—C₆H₅, —C₂H₄OH or the like; compounds of the general formula

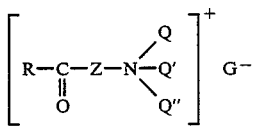

wherein R denotes, for example, an aliphatic hydrocarbon radical, an alicyclic hydrocarbon radical substituted by alkyl group(s), an aralkyl group, an alkylphenyl group or the like, Z denotes, for example, —C₆H₄—, and Q, Q' and Q'' each denotes, for example, —CH₃, —C₂H₅, —C₂H₄OH or the like; compounds of the general formula

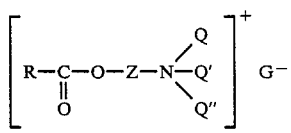

wherein R denotes, for example, an aliphatic hydrocarbon radical, an alicyclic hydrocarbon radical substituted by alkyl group(s), an aralkyl group, an alkylphenyl group or the like, Z denotes, for example, —CH₂—, —C₂H₄— or the like, and Q, Q' and Q'' each denotes, for example, —CH₃, —C₂H₅, —C₂H₄OH or the like; compounds of the general formula

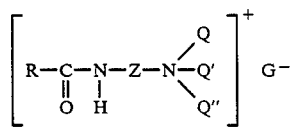

wherein R denotes, for example, an aliphatic hydrocarbon radical, an alicyclic hydrocarbon radical substituted by alkyl group(s), an aralkyl group, an alkylphenyl group or the like, Z denotes, for example, —C₂H₄—, —C₃H₆— or the like, and Q, Q' and Q'' each denotes, for example, —CH₃, —C₂H₅, —C₂H₄OH or the like; compounds of the general formula

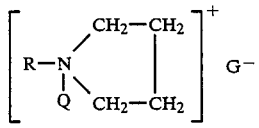

wherein R denotes, for example, an aliphatic hydrocarbon radical, an alicyclic hydrocarbon radical substituted by alkyl group(s), an aralkyl group, an alkylphenyl group or the like, and Q denotes, for example, —CH₃, —C₂H₅, —C₂H₄OH or the like; compounds of the general formula

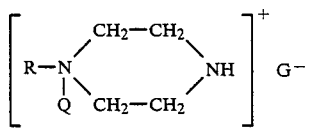

wherein R denotes, for example, an aliphatic hydrocarbon radical, an alicyclic hydrocarbon radical substituted by alkyl group(s), an aralkyl group, an alkylphenyl group or the like, and Q denotes, for example, —CH₃, —C₂H₅, —C₂H₄OH or the like; compounds of the general formula

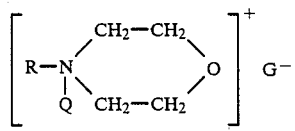

wherein R denotes, for example, an aliphatic hydrocarbon radical, an alicyclic hydrocarbon radical substituted by alkyl group(s), an aralkyl group, an alkylphenyl group or the like, and Q denotes, for example, —CH₃, —C₂H₅, —C₂H₄OH or the like; compounds of the general formula

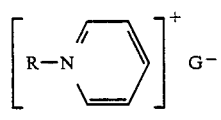

wherein R denotes, for example, an aliphatic hydrocarbon radical, an alicyclic hydrocarbon radical substituted by alkyl group(s), an aralkyl group, an alkylphenyl group or the like; compounds of the general formula

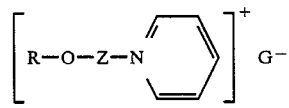

wherein R denotes, for example, an aliphatic hydrocarbon radical, an alicyclic hydrocarbon radical substituted by alkyl group(s), an aralkyl group, an alkylphenyl group or the like and Z denotes, for example, —CH₂—; compounds of the general formula

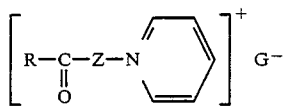

wherein R denotes, for example, an aliphatic hydrocarbon radical, an alicyclic hydrocarbon radical substituted by alkyl group(s), an aralkyl group, an alkylphenyl group or the like, and Z denotes, for example, $-C_6H_4-$, $-C_6H_4-CH_2-$ or the like; compounds of the general formula

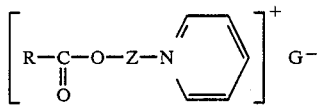

wherein R denotes, for example, an aliphatic hydrocarbon radical, an alicyclic hydrocarbon radical substituted by alkyl group(s), an aralkyl group, an alkylphenyl group or the like, Z denotes, for example, $-CH_2-$; compounds of the formula

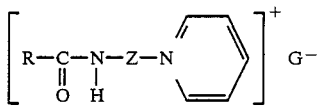

and compounds of the general formula

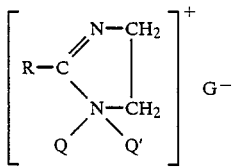

wherein R denotes, for example, an aliphatic hydrocarbon radical, an alicyclic hydrocarbon radical substituted by alkyl group(s), an aralkyl group, an alkylphenyl group or the like, and Q and Q' each denotes, for example, $-CH_3$, $-C_2H_5$, $-C_2H_4OH$ or the like; compounds of the general formula

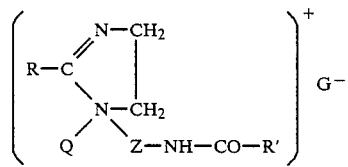

wherein R and R' each denotes, for example, an aliphatic hydrocarbon radical, an alicyclic hydrocarbon radical substituted by alkyl group(s), an aralkyl group, an alkylphenyl group or the like, Q denotes, for example, $-CH_3$, $-C_2H_5$, $-C_2H_4OH$ or the like and Z denotes, for example, $-CH_2-$; compounds of the general formula

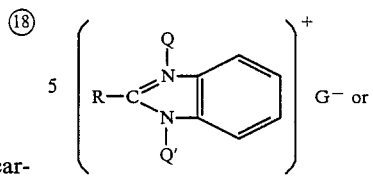

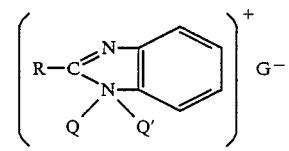

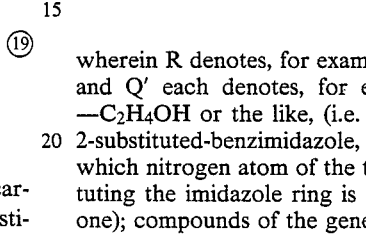

wherein R denotes, for example, an alkyl group, and Q and Q' each denotes, for example, $-CH_3$, $-C_2H_5$, $-C_2H_4OH$ or the like, (i.e. quaternary compounds of 2-substituted-benzimidazole, in which it is not clear which nitrogen atom of the two nitrogen atoms constituting the imidazole ring is converted into quaternary one); compounds of the general formula

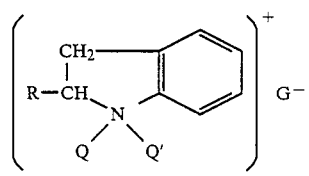

wherein R denotes, for example, an alkyl group, and Q and Q' each denotes, for example, $-CH_3$, $-C_2H_5$, $C_2H_4OH$ or the like; and compounds of the general formula

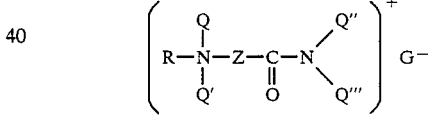

wherein R denotes, for example, an alkyl group, Z denotes, for example, $-CH_2-$, $-C_2H_4-$ or the like, and Q, Q', Q" and Q'" each denotes, for example, $-CH_3$, $-C_2H_5$, $-C_2H_4OH$ or the like, are mentioned as examples of the compounds represented by the general formula (V).

The compositions of the present invention contain the above anionic surfactant(s) and the above cationic surfactant(s) in a ratio of 79–50%, preferably 75–51% by weight of the former, to, 21–50%, preferably 25–49% by weight of the latter per total weight of the two. When the former is contained in an amount of more than 79% by weight, the foaming property of the composition for promoting dewatering is enhanced and the defoaming becomes difficult. Moreover, a cement prepared from the granulated slag treated with such a composition for promoting dewatering shows retardation of hardening. Therefore, it is not preferable to use the anionic surfactant(s) in an amount of more than 79% by weight. On the other hand, it is also not preferable to use the anionic surfactant(s) in an amount of less than 50% by weight, since a cement prepared from the granulated slag treated with a composition for promoting dewatering which contains the anionic surfactant(s) in a ratio of less than 50% gives a cement mortar whose compressive strength is lowered. When the ratio of the anionic surfactant(s) is 79-50% by weight of the total amount of the two surfactant(s), the foaming power of the resulting composition for promoting dewatering is suppressed. Such a composition shows a superior effect of promoting dewatering and, moreover, does not substantially affect the hardening velocity of the cement prepared from the slag treated with it and the strength of the hardened cement articles.

Such compositions may include, a defoaming agent added thereto. By combination with a defoaming agent, the foaming during use in on industrial scale can be substantially prevented. Therefore, it is preferable to add a defoaming agent to the compositions as occasion demands. Although there is no limitation on the amount of defoaming agent to be added, it is usually suitable to add a defoaming agent in an amount of 5-100 parts by weight, preferably 5-50 parts by weight, per 100 parts by weight of the total anionic and cationic surfactants. As the defoaming agent, the so-called silicone defoaming agents are preferably used, and surfactants of pluronic series can also be used.

Needless to say, the compositions for promoting dewatering of the present invention may contain, if necessary, any other ingredients which do not adversely affect the slag and the above-mentioned surfactants (such as a viscosity-modifier, pH-modifier, fungicide, solvent, etc.).

when the surfactants of the present invention (i.e. the total of the above-mentioned anionic surfactant(s) and the above-mentioned cationic surfactant(s)) are used in too small an amount, the effect of promoting dewatering is weak, and when they are used in too great an amount the surfactants are wasted without any enhancement in the effect of promoting dewatering. Therefore, it is preferable to use the surfactants in an amount of 1-0.002% by weight, particularly 0.5-0.005% by weight, of the dry weight of the granulated slag to be treated.

The granulated slag to be treated with the composition of the present invention is a wet or moisture-containing granulated slag which may be in water or removed from the water.

In treating the wet, granulated slag with the composition of the present invention, the composition may be used in the form of a solution, preferably in an aqueous medium. The system to be treated is preferably maintained at a pH of 7 or higher while the granulated slag is treated. A pH lower than 7 is unfavorable because the effect of promoting dewatering becomes weak. When the pH is too high, it may become dangerous to human body, though the effect of promoting dewatering is good. Therefore, it is preferable to carry out the treatment at a pH not higher than 11 especially at a pH not higher than 10.

According to the process of this invention, granulated slag dipped in water having a pH of 7 or higher can be treated by adding the composition of the present invention directly to the dipping water or adding a substantially neutral or alkaline solution of the composition thereto and then stirring the mixture. When granulated slag has already been removed from water, a method of dipping it in a substantially neutral or alkaline solution of the composition or a method of scattering a substantially neutral or alkaline solution of the composition onto the wet, granulated slag can be used. The water adherent to slag contains CaO eluted from the slag, and accordingly is usually alkaline. Therefore, even if a solution of the composition is acidic, it can be used in the process of this invention on the condition that it is within the range capable of being alkaline or neutral as it is mixed with the water adherent to slag or the water in which slag is dipped. When the liquor separated from slag after the treatment of wet, granulated slag with a solution of the composition is neutral or alkaline the treatment of the slag should be deemed to have been performed under neutral or alkaline condition.

The composition may beforehand be added to an aqueous medium to be used for the preparation of granulated slag from fused slag. This means that while fused slag is granulated, quenched and dipped in the aqueous medium to form a slurry, the treatment with the composition is simultaneously conducted. The aqueous medium to be used for the preparation of granulated slag mentioned above is called "circulating water", because it is separated and re-used. Thus, it is preferred to treat the granulated slag with the addition of the composition to "circulating water", because such treatment can be conducted in conventional apparatus for the preparation of granulated slag without any substantial modification thereof and without causing foaming problems as occurred in the prior art.

The concentration of the surfactants, that is, the total concentration of the anionic surfactant(s) and the cationic surfactant(s) in the solution used for the treatment for promoting dewatering of granulated slag is preferably 0.003% by weight or higher, particularly 0.005% by weight or higher. When the concentration is too low, the effect of promoting dewatering is lowered. On the other hand, when the concentration is too high, the ratio of the surfactants used to the granulated slag becomes high and so the surfactants are wasted. Usually, it is preferable to keep the concentration at 2% by weight or lower.

When the composition of the present invention is used in the form of its aqueous solution for the treatment for promoting dewatering of granulated slag, it may happen depending on the quality or properties of the water used as solvent that the cationic surfactant(s) contained in the composition produce(s) precipitates. In such case, a cationic surfactant which does not produce precipitates in said water must be selected. By adding a cationic surfactant to the water to confirm whether any precipitates are formed or not, it is possible to judge whether the cationic surfactant is suitable or not for the use in the same water. For example, when the $SO_4^{-2}$ ion content in water is high, many types of cationic surface active agents form precipitates.

By the treatment for promoting dewatering according to the process of this invention, elimination of the moisture from the wet, granulated slag becomes easy and rapid. The moisture content of granulated slag is significantly lowered by merely allowing water to drip from the slag for 30-60 minutes, as compared with the slag not subjected to this treatment.

According to the process of this invention, however, the granulated slag may be dried after the treatment with a solution of the composition, or it may be allowed to drip before the drying. The drying is usually sufficiently performed by spontaneous drying. Spontaneous drying means to dry without heating artificially. Therefore, the latent heat necessary for the evaporation of moisture is supplied from the heat held in the slag itself, the heat conduction from the atmosphere and the ground provided for the drying, the radiant heat from the sun, and the like. However, the effect of the present invention is evident even when the slag treated is subjected to a forced drying. Therefore, the present invention is not at all restricted by the means of drying.

The agent used for promoting dewatering according to the present invention also prevents solidification or aggregation of granulated slag.

The term "moisture content" used in this specification means the ratio of the weight of moisture to the total wet weight.

The invention is explained more fully by the following Examples which, however, do not limit the invention to the precise details and conditions set forth.

EXAMPLE 1

Using

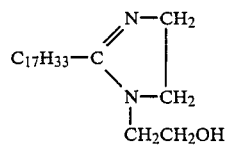

as cationic surface active agent and $C_{12}H_{25}O(CH_2CH_2O)_nSO_3Na$ [the mean value of n is 3] as anionic surface active agent, mixtures of the two surface active agents having various compounding ratios as shown in the following Table 1 were prepared. Each mixture was dissolved in industrial tap water to form a solution having a concentration of 250 ppm (by weight). The foaming just after the dropping of the solution at 40° C. was measured according to Ross & Miles method. For comparison, a solution containing the cationic surface active agent only, or the anionic surface active agent only, in a concentration of 250 ppm (by weight) was prepared and the foaming just after the dropping of such solution was also measured. The height of foaming is shown in Table 1. It is apparent that the foaming is significantly decreased by the composition of this invention.

TABLE 1

| Experiment No. | Comparison | | Present Invention | | | Comparison | |
|---|---|---|---|---|---|---|---|
| | I | II | III | IV | V | VI | VII |
| Compounding Ratio Anionic Surface Active Agent | 100 | 85 | 75 | 65 | 55 | 25 | 0 |
| Cationic Surface Active Agent | 0 | 15 | 25 | 35 | 45 | 75 | 100 |
| Height of Foaming (mm) | 55 | 50 | 30 | 15 | 4 | 32 | 50 |

In each Experiment, 613 g of wet, granulated slag (having a moisture content of 18.4%) (i.e. 500 g on a dry basis) was collected, and dipped and stirred in 500 g of the surface active agent solution at 40° C. for 2 minutes, and then heaped up conically in a basket made of stainless steel mesh to leave standing for air-drying at room temperature. Each treatment liquor after the treatment of the slag had a pH within the range of 9.0–9.2.

For comparison's sake, 613 g of the same wet, granulated slag was dipped and stirred in 500 g of industrial tap water containing no surface active agent at 40° C. for 2 minutes, and then the slag was heaped up conically in the same basket to leave standing for air-drying at room temperature (Experiment No. VIII). The tap water after the treatment of the slag had a pH of 9.1.

The room temperature was maintained while the air-drying within the range of 25°–15° C. At 1 hour and 48 hours after the beginning of the air-drying, the moisture content of the slag was calculated according to the following equation, by measuring the total weight of the basket and the slag:

Moisture Content (%) =

$$\left[1 - \frac{500 \text{ (g)}}{\text{Weight measured (g)} - \text{Weight of basket (g)}}\right] \times 100$$

The results obtained are shown in the following Table 2:

TABLE 2

| Experiment No. | Comparison | | Present Invention | | | Comparison | | |
|---|---|---|---|---|---|---|---|---|
| | I | II | III | IV | V | VI | VII | VIII |
| | Moisture Content of Slag (%) | | | | | | | |
| After 1 hour | 12.3 | 12.5 | 12.4 | 12.7 | 13.0 | 13.3 | 13.5 | 21.5 |
| After 1 hour | 12.3 | 12.5 | 12.4 | 12.7 | 13.0 | 13.3 | 13.5 | 21.5 |
| After 48 hours | 3.3 | 3.4 | 3.5 | 3.5 | 3.8 | 4.0 | 4.0 | 12.5 |

EXAMPLE 2

Compositions containing the anionic surfactant and the cationic surfactant in a compounding ratio of 65:35 (by weight) and also 25 parts by weight of a silicone defoaming agent (Dow Corning's product FSX-001 was used) incorporated per 100 parts by weight of the total surfactant were prepared. Each composition was dissolved in industrial tap water to form a solution having a concentration of 125 ppm (by weight).

The anionic surfactant used here was $C_{18}H_{37}CONH(CH_2CH_2O)_nSO_3Na$ (the mean value of n is 6), and as the cationic surfactant was used one of the following A–L:

| | |
|---|---|
| $C_{12}H_{25}NH_2$·acetate | A |
| $C_{11}H_{23}CONHC_2H_4NHCH_2CH_2OH$·acetate | B |
| $C_{18}H_{37}NHC(NH)NH_2$·acetate | C |
| $C_{11}H_{23}-C\underset{H}{\overset{N}{\underset{\\}{\diagup}}}\!\!\!\diagdown\text{(benzimidazole)}\cdot\text{hydrochloride}$ | D |
| $[C_{14}H_{29}N(CH_3)_3]^+Cl^-$ | E |
| $[(C_{12}H_{25})_2N(CH_3)_2]^+Cl^-$ | F |
| $\{C_9H_{19}\text{-}C_6H_4\text{-}O\text{-}CH_2\text{-}N(CH_3)_3\}^+Cl^-$ | G |
| $\{C_{11}H_{23}\text{-}CO\text{-}C_6H_4\text{-}N(CH_3)_3\}^+Cl^-$ | H |
| $[C_{11}H_{23}\text{-}COOC_2H_4N(CH_3)_3]^+Cl^-$ | I |
| $[C_{11}H_{23}CONHC_2H_{14}N(CH_3)_3]^+Cl^-$ | J |

-continued $$\left[ C_9H_{19}-\underset{\underset{CH_3}{|}}{\overset{\overset{CH_2-CH_2}{\diagup}}{N}}\underset{CH_2-CH_2}{\diagdown}NH \right]^+ Cl^-  \quad K$$

$$\left[ C_{12}H_{25}-\underset{\underset{CH_3}{|}}{\overset{\overset{CH_2-CH_2}{\diagup}}{N}}\underset{CH_2-CH_2}{\diagdown}O \right]^+ Cl^- \quad L$$

As the foaming was measured at 25° C. according to the Ross & Miles method with respect to each of the above solutions, the height of foaming was zero in every case.

In 500 g of each solution, 601 g (500 g dry basis) of wet, granulated slag (having a moisture content of 16.8%) was dipped and stirred at 25° C. for 2 minutes. Then, the slag was air-dried in the same manner as Example 1. The solution after the treatment of the slag showed each a pH within the range of 9.0–9.2.

For comparison's sake, 601 g of the same wet, granulated slag was dipped and stirred in 500 g of industrial tap water containing no surface active agent at 25° C. for 2 minutes, and then the slag was air-dried at room temperature in the same manner. The tap water after the treatment of slag had a pH of 9.1.

The room temperature was maintained while the air-drying at 25–15° C.

At 1 hour and 52 hours after the beginning of the air-drying, the moisture content of the slag was measured in the same manner as Example 1. The results obtained are shown in the following Table 3:

TABLE 3

| Experiment No. | I | II | III | IV | V | VI | VII | VIII |
|---|---|---|---|---|---|---|---|---|
| Cationic Surfactant used | A | B | C | D | E | F | G | H |
| Moisture Content of Slag (%) | | | | | | | | |
| Content of Slag (%) | | | | | | | | |
| After 1 hour | 12.6 | 12.3 | 12.0 | 13.0 | 12.6 | 12.4 | 12.5 | 12.8 |
| After 52 hours | 3.1 | 2.7 | 2.5 | 3.3 | 2.8 | 2.6 | 2.9 | 3.0 |

| Experiment No. | IX | X | XI | XII | XIII (Comparison) |
|---|---|---|---|---|---|
| Cationic Surfactant used | I | J | K | L | — |
| Content of Slag (%) | | | | | |
| After 1 hour | 12.6 | 12.8 | 13.1 | 12.7 | 20.6 |
| After 52 hours | 2.7 | 3.0 | 2.9 | 3.0 | 10.7 |

From the results as disclosed above, it is apparent that the dewatering and drying of the slag are significantly promoted according to the present invention and the foaming of the treatment liquor is also suppressed.

EXAMPLE 3

Compositions containing the anionic surfactant and the cationic surfactant in a compounding ratio of 60:40 (by weight) and also 20 parts by weight of a silicone defoaming agent (Dow Corning's product FSX-001 was used) incorporated per 100 parts by weight of the total surfactant were prepared. Each composition was dissolved in industrial tap water to form a solution having a concentration of 120 ppm (by weight).

The anionic surfactant used here was $C_{12}H_{25}OCH_2O(CH_2CH_2O)nSO_3Na$ (the mean value of n is 4) and as the cationic surfactant was used one of the following A–H:

$$\left[ C_{12}H_{25}-O-CH_2-N\overset{+}{\diagdown}\!\!\!\diagup \right] Cl^- \quad A$$

$$\left[ C_{11}H_{23}-C\!\!-\!\!\!\!\bigcirc\!\!\!\!-CH_2-N\overset{+}{\diagdown}\!\!\!\diagup \right] Cl^- \quad B$$

$$\left[ C_{11}H_{23}-\underset{\underset{O}{\|}}{C}-O-CH_2-N\overset{+}{\diagdown}\!\!\!\diagup \right] Cl^- \quad C$$

$$\left[ C_{11}H_{23}-\underset{\underset{O}{\|}}{C}-\underset{\underset{H}{|}}{N}-CH_2-N\overset{+}{\diagdown}\!\!\!\diagup \right] Cl^- \quad D$$

$$\left[ C_{11}H_{23}-C\underset{\underset{CH_3}{\diagdown}N-CH_2}{\overset{\diagup N-CH_2}{\diagup}} \atop CH_2-CH_2-NH-CO-C_{11}H_{23} \right]^+ Cl^- \quad E$$

$$\left[ C_{11}H_{23}-C\underset{\underset{CH_3}{\diagdown}N}{\overset{\diagup N}{\diagup}}\!\!\!\bigcirc \atop CH_3 \right]^+ Cl^- \quad F$$

$$\left[ C_{12}H_{25}-CH\underset{\underset{CH_3}{\diagdown}N}{\overset{\diagup CH_2}{\diagup}}\!\!\!\bigcirc \atop CH_3 \right]^+ Cl^- \quad G$$

$$\left[ C_{18}H_{37}-\underset{\underset{CH_3}{\diagdown}}{\overset{\diagup}{N}}-CH_2-\underset{\underset{O}{\|}}{C}-\underset{\underset{CH_3}{\diagdown}}{\overset{\overset{CH_3}{|}}{N}}-CH_3 \right]^+ Cl^- \quad H$$

The foaming was measured at 25° C. according to the Ross & Miles method, and the above solutions all exhibited a height of foaming just after the dropping of zero.

In 500 g of each solution, 618 g (500 g dry basis) of wet, granulated slag (having a moisture content of 19.1%) was dipped and stirred at 25° C. for 2 minutes. Then, the slag was air-dried in the same manner as Example 1. The solution after the treatment of the slag showed each a pH within the range of 9.0–9.2.

For comparison's sake, 601 g of the same wet, granulated slag was dipped and stirred at 25° C. for 2 minutes in 500 g of industrial tap water to which no surface active agent was added. Then, the slag was air-dried at room temperature according to the same manner. The tap water after the treatment of slag had a pH of 9.1.

The room temperature was maintained at 25–15° C. during the air-drying.

At 1 hour and at 54 hours after the beginning of air-drying, the moisture content of the slag was measured in the same manner as Example 1. The results obtained are shown in the following Table 4:

TABLE 4

| Experiment No. | I | II | III | IV | V | VI | VII | VIII | IX (Comparison) |
|---|---|---|---|---|---|---|---|---|---|
| Cationic Surfactant used | A | B | C | D | E | F | G | H | — |
| Moisture Content of Slag (%) | | | | | | | | | |
| After 1 hour | 17.8 | 17.5 | 17.7 | 17.2 | 17.0 | 17.6 | 17.9 | 17.1 | 25.6 |
| After 54 hours | 3.8 | 3.5 | 3.7 | 3.4 | 3.3 | 3.6 | 3.8 | 3.3 | 12.8 |

From the above results, it is apparent that the dewatering and drying of slag are significantly promoted according to the present invention, and the foaming of the treatment liquor is also suppressed.

EXAMPLE 4

Using

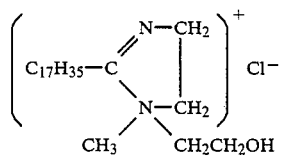

as the cationic surfactant and $C_{20}H_{41}O(CH_2CH_2O)_n$-$SO_3Na$ (the mean value of n is 10) as the anionic surfactant, a mixture of the two surfactant in a compounding ratio of 40% by weight of the former to 60% by weight of the latter was prepared and 40 parts by weight of a defoaming agent (a Dow-Corning product FSX-001 was used) was incorporated to 100 parts by weight of the resulting mixture. By adding the composition so obtained to circulating water in a system for preparing granulated slag of a certain iron foundry (the circulating water was rich in $Cl^-$, $SO_4^{2-}$, etc. and had a pH of 9.5), a treatment liquor I having a concentration of 98 ppm (by weight) was prepared.

By adding a composition prepared by incorporating 40 parts by weight of the above silicone defoaming agent into 100 parts by weight of the above cationic surface active agent, to the above circulating water, a treatment liquor II having a concentration of 98 ppm (by weight) was prepared for comparison's sake.

Similarly, by adding the above anionic surface active agent and further the above defoaming agent to the circulating water, a treatment liquor III having a concentration of 70 ppm (by weight) of said anionic surface active agent and a concentration of 28 ppm (by weight) of said defoaming agent was prepared also for comparison's sake. (A mixture of the above anionic surface active agent and the above defoaming agent or a thick emulsion of the two could not be prepared.)

Foaming was measured just after the preparation of the above treatment liquors at 25° C. according to the Ross & Miles method, the height of foaming was zero for the treatment liquor I and the treatment liquor II while it was 25 mm for the treatment liquor III. However, the treatment liquor II began to foam as the time passed and, after a lapse of 1 month, exhibited a height of foaming of 20 mm as measured according to the Ross & Miles method, while the treatment liquor I did not foam even after the passage of time.

A thick emulsion of the composition of the above cationic surfactant, anionic surfactant and defoaming agent (of the same compounding ratio as mentioned above) was prepared and stored for 3 months. Then, a treatment liquor I was prepared using the thick emulsion. The treatment liquor I so prepared exhibited also a height of foaming of zero, as measured according to the Ross & Miles method. However, when the thick emulsion was used after further storage for the preparation of a treatment liquor II, the foaming just after the preparation of the treatment liquor II became greater as the length storage became longer.

Thus, when a defoaming agent is compounded with a cationic surfactant, the foaming can be suppressed just after the compounding. The foaming, however, increases as storage time increases.

In 500 g of each of the above treatment liquors I–III, 601 g (500 g on a dry basis) of wet, granulated slag (having a moisture content of 16.8%) was dipped and stirred at 25° C. for 2 minutes. Then, the slag was air-dried in the same manner as Example 1. Each solution after the treatment of the slag had a pH of 9.5.

For comparison's sake, 601 g of the same wet, granulated slag was dipped and stirred at 25° C. for 2 minutes in 500 g of the above circulating water, to which surfactant was not added. Then the slag was air-dried at room temperature in the same manner (Experiment No. IV). The circulating water after the treatment of slag had a pH of 9.5.

The room temperature was maintained at 25–15° C. during the air-drying.

At 50 hours after the beginning of air-drying, the slag in the basket was agitated so as to become uniform and then its moisture content was measured by means of an infrared moisture-meter. The results obtained are shown in the following Table 5:

TABLE 5

| Experiment No. | Present Invention I | Comparison | | |
|---|---|---|---|---|
| | | II | III | IV |
| Treatment Liquor | Treatment Liquor I | Treatment Liquor II | Treatment Liquor III | Circulating Water |
| Moisture Content of Slag (%) | 3.8 | 4.1 | 3.6 | 11.0 |

The passage of time had no effect on the ability of the treatment liquors to promote dewatering.

EXAMPLE 5

Compositions containing the anionic surfactant and the cationic surfactant in a compounding ratio of 55:45

(by weight) and a silicone defoaming agent (a Dow-Corning product FSX-001 was used) incorporated in an amount of 20 parts by weight per 100 parts by weight of the total of the two surfactants were prepared. Each composition was dissolved in the same circulating water of the system for preparing granulated slag as used in Example 4, to prepare a solution having a concentration of 90 ppm (by weight).

The anionic surfactant used here was $C_{12}H_{25}O(CH_2CH_2O)nSO_3Na$ (the mean value of n is 3) and as the cationic surfactant was used one of the following A–C:

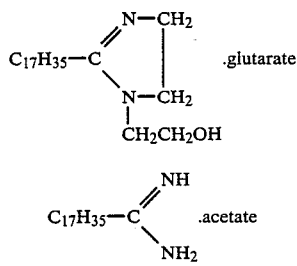

A

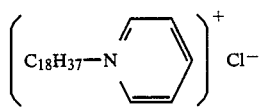

B $$\left( C_{18}H_{37}-N\!\!\diagup\!\!\diagdown \right)^{+} Cl^{-}$$

C

The foaming was measured at 25° C. according to the Ross & Miles method, and all the above solutions exhibited a height of foaming just after the dropping of zero.

In 500 g of each solution, 618 g (500 g dry basis) of wet, granulated slag (having a moisture content of 19.1%) was dipped and stirred at 25° C. for 2 minutes, and then the slag was air-dried in the same manner as Example 1. Each solution after the treatment of the slag had a pH of 9.5.

For comparison's sake, 618 g of the same wet, granulated slag was dipped and stirred at 25° C. for 2 minutes in 500 g of the same circulating water to which surfactant was not added. Then, the slag was air-dried at room temperature in the same manner. The circulating water after the treatment of the slag had a pH of 9.5.

The room temperature was maintained at 25°–15° C. during the air-drying.

At 56 hours after the beginning of the air-drying, the moisture content of the slag was measured in the same manner as Example 4. The results obtained are shown in the following Table 6:

TABLE 6

| Experiment No. | Present Invention | | | Comparison |
|---|---|---|---|---|
| | I | II | III | IV |
| Cationic Surfactant used | A | B | C | — |
| Moisture Content of Slag (%) | 3.5 | 3.3 | 3.9 | 11.9 |

EXAMPLE 6

Compositions consisting of 55% by weight of the anionic surfactant and 45% by weight of the cationic surfactant were dissolved in industrial tap water to prepare solutions having a concentration of 100 ppm (by weight).

The anionic surfactant used here was $C_{11}H_{23}CONH(CH_2CH_2O)nSO_3Na$ (the mean value of n is 6) and as the cationic surfactant was used one of the following A–C:

| A | $[C_{14}H_{29}N(CH_3)_3]^+Cl^-$ |
| B | $C_{11}H_{23}CONHC_2H_4N(CH_2CH_2OH)_2$.acetate |
| C | $C_{12}H_{25}N(CH_2CH_2OH)_2$.hydrochloride |

For comparison's sake, a solution in the same industrial tap water of the above anionic surfactant only having a concentration of 100 ppm (by weight) [Experiment No. IV] and that of the above cationic surfactant A only having a concentration of 100 ppm (by weight) [Experiment No. V] were prepared.

The foaming of each of these solutions was measured according to the Ross & Miles method.

In 500 g of each solution, 613 g (500 g dry basis) of wet, granulated slag (having a moisture content of 18.4%) was dipped and stirred at 25° C. for 2 minutes, and then the slag was air-dried in the same manner as Example 1. Each solution after the treatment of the slag had a pH within the range of 9.0–9.2.

For comparison's sake, 613 g (500 g dry basis) of the same wet, granulated slag was dipped and stirred at 25° C. for 2 minutes in 500 g of the same industrial tap water to which surface active agent was not added. The slag was then air-dried at room temperature in the same manner (Experiment No. VI). The tap water after the treatment of the slag had a pH of 9.1.

The room temperature while the air-drying was 20°–30° C.

At 6 hours and 48 hours after the beginning of the air-drying, the moisture content of the slag was measured in the same manner as Example 1.

The results obtained by measurement of the foaming of solutions and of the moisture content of slags are shown in the following Table 7:

TABLE 7

| No. | Present Invention | | | Comparison | | |
|---|---|---|---|---|---|---|
| | I | II | III | IV | V | VI |
| Cationic Surfactant used | A | B | C | Anionic One only, without Cationic one | Cationic A only, without Anionic one | — |
| Height of the Foaming (mm) just after the Dropping of Solution | 3 | 2 | 2 | 18 | 14 | — |
| Moisture Content of Slag (%) | | | | | | |
| After 6 hours | 11.6 | 11.9 | 12.4 | 11.2 | 12.6 | 20.6 |
| After 48 hours | 2.5 | 2.7 | 2.9 | 2.5 | 3.1 | 9.0 |

EXAMPLE 7

Compositions consisting of 60% by weight of the anionic surfactant and 40% by weight of the cationic surfactant were dissolved in the same circulating water in a system for preparing granulated slag as used in Example 4, to prepare solutions having a concentration of 100 ppm (by weight).

The anionic surfactant used here was $CH_{12}H_{25}O(CH_2CH_2O)nSO_3Na$ (the mean value of n being 4) and as the cationic surfactant was used one of the following A-C:

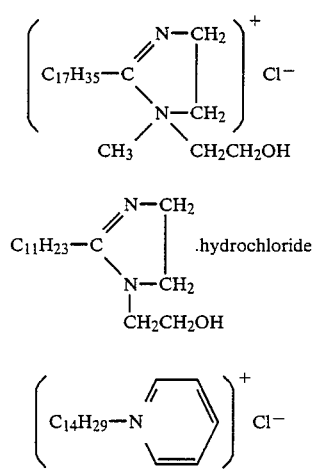

The foaming of each of these solutions was measured according to the Ross & Miles method.

In 500 g of each solution, 618 g (500 g dry basis) of wet, granulated slag (having a moisture content of 19.1%) was dipped and stirred at 25° C. for 2 minutes. Then, the slag was air-dried in the same manner as Example 1. The solution after the treatment of the slag had a pH of 9.5.

For comparison's sake, 618 g of the same wet, granulated slag was dipped and stirred at 25° C. for 2 minutes in 500 g of the same circulating water to which surfactant was not added. The slag was then air-dried at room temperature in the same manner (Experiment No. IV). The circulating water after the treatment of the slag had a pH of 9.5.

The room temperature while the air-drying was 25°–15° C.

At 64 hours after the beginning of the air-drying, the moisture content of the slag was measured in the same manner as Example 4. The results obtained by measurement of the foaming of solutions and of the moisture content of slags are shown in the following Table 8:

TABLE 8

| Experiment No. | Present Invention I | II | III | Comparison IV |
|---|---|---|---|---|
| Cationic Surfactant used | A | B | C | — |
| Height of the Foaming (mm) just after the Dropping of Solution | 4 | 3 | 3 | — |
| Mositure Content of Slag (%) | 2.8 | 2.9 | 2.6 | 9.4 |

EXAMPLE 8

In the slag granulation system as shown in FIG. 1, the treatment of the granulated slag was conducted by adding the composition of the present invention into circulating water. FIG. 1 shows blast furnace 1, molten slag 2, blowing box 3, cold runner 4, stack 5, granulation basin 6, pump 7, INBA filter 8, belt conveyor 9, distributor 10, belt conveyor 11, hopper of granulated slag 12, dewatering equipment 13, water collecting tank 14, hot water basin 15, pump 16, cooling tower 17, steam 18, make-up water 19, pump 20 and circulating water 21.

The formulation of the composition used here was as follows.

| | |
|---|---|
| $C_{17}H_{25}-C\underset{N-CH_2}{\overset{N-CH_2}{\diagup\diagdown}}$ <br> $\quad\quad\quad\quad\; \mid$ <br> $\quad\quad\quad\; CH_2CH_2OH$ | 45 parts by weight |
| $C_{12}H_{25}O(CH_2CH_2O)_nSO_3Na$ (mean value of n is 3) | 55 parts by weight |
| Silicone defoaming agent (a Dow Corning product FSX-001) | 10 parts by weight |
| pH-modifier (succinic acid) | 11 parts by weight |
| (Total 121 parts by weight) | |

Prior to the preparation of granulated slag by the system, the composition was added to circulating water 21 to form a solution having a concentration of 100 ppm. During the preparation of granulated slag, the concentrated dispersion of the composition was replenished with the water at hot water basin 15 so that the concentration of the composition was kept to 100 ppm at pump 20. The water ratio was 8–5 m³/ton (slag) during the preparation of granulated slag.

In this system, molten (fused) slag 2 was solidified and granulated by circulating water between blowing box 3 and granulation basin 6, and incorporated into the water in the basin 6 to form a slurry. The slurry was supplied to filter 8, where the granulated slag was separated from water, and then the slag was supplied to hopper 12.

No trouble due to the foaming of circulating water was caused during the preparation.

The granulated slag loaded from hopper 12 into a truck had a moisture content of 16–14%, provided that the moisture content was calculated according to the following equation:

Moisture content (%) =

$$\frac{A - \text{Weight of dry, granulated slag}}{\text{Weight of wet, granulated slag }(A)} \times 100$$

For comparison's sake, the preparation of the granulated slag was similarly conducted in the system except that the composition of the invention was not added to the circulating water. The granulated slag loaded from hopper 12 into a truck had a moisture content of 25–30%.

According to the present invention, dewatering or drying of wet, granulated slag is promoted. Therefore, the moisture content of granulated slag can be decreased to a level lower than that attained hitherto, even by merely spontaneously drying the wet, granulated slag in a thick heap. It becomes possible to dry granulated slag to a moisture content of 4% or less, by spontaneous drying only, and so it becomes unnecessary to dry the slag by heating before using it as cement material. Moreover, the foaming of treatment liquors used for promoting dewatering of slag can also be suppressed.

What we claim is:

1. The combination of wet granulated slag in contact with a granulated slag dewatering composition for promoting dewatering of the granulated slag, which composition has a reduced tendency to foam and which comprises an ionic surfactant component, said ionic surfactant component consisting essentially of
   (a) one or more of anionic surfactants selected from the group consisting of those represented by the general formula $$[RO-(CH_2CH_2O)_{\overline{n}}-SO_3M] \quad (I)$$

$$C_{12}H_{25}O-(CH_2CH_2O)_{\overline{n}}-SO_3M$$

$$RCON-(CH_2CH_2O)_{\overline{n}}-SO_3M, \quad (II)$$
   $$\quad\quad\quad |$$
   $$\quad\quad\quad R'$$

and $$RCOOCH_2O-(CH_2CH_2O)_{\overline{n}}-SO_3M \quad (III)$$

wherein R denotes a monovalent hydrocarbon radical of $C_{11-30}$, R' denotes a hydrogen atom or a monovalent hydrocarbon radical of $C_{1-7}$, M denotes an inorganic cation of $H^+$, $Na^+$, $K^+$, $NH_4^+$, $\frac{1}{2} Mg^{2+}$ or $\frac{1}{2} Ca^{2+}$ and the mean value of n is 3–20, provided that for formula (I) n is 3, and
   (b) one or more of cationic surfactants selected from the group consisting of free bases represented by the general formula $$R-X \quad (IV)$$

and their acid-addition salts, and compounds containing a quaternary nitrogen atom represented by the general formula $$(R-Y)^+G^- \quad (V)$$

wherein R denotes a monovalent hydrocarbon radical of $C_{11-30}$, X denotes:

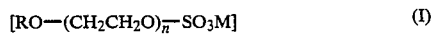

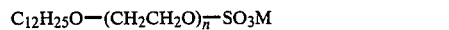

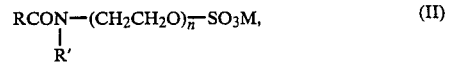

Y denotes:

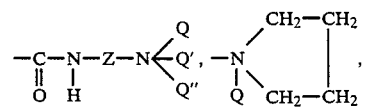

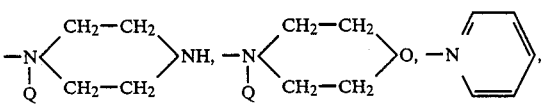

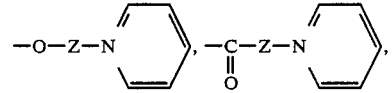

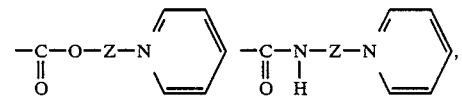

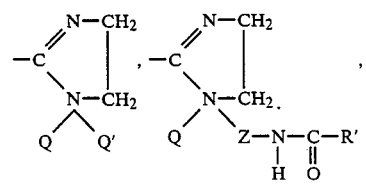

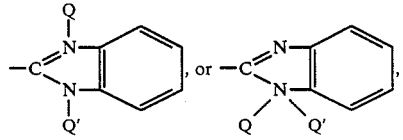

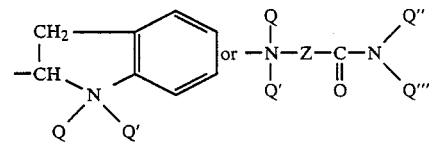

wherein A and A' may be identical with or different from each other and each denotes a hydrogen atom or a hydroxyalkyl group of $C_{1-4}$, A'' and A''' may be identical to or different from each other and each denotes a hydrogen atom, a monovalent hydrocarbon radical of $C_{1-7}$, or a hydroxyalkyl group of $C_{1-4}$, Q, Q', Q'' and Q''' may be identical with one another or not and each denotes a monovalent hydrocarbon radical of $C_{1-7}$ or a hydroxyalkyl group of $C_{1-4}$, R' denotes a monovalent hydrocarbon radical of $C_{1-30}$ which may be identical with or different from R, Z and Z' each denotes a divalent hydrocarbon radical of $C_{1-7}$ and may be identical with or different from each other, and G denotes a monovalent anion, said anionic surfactant(s) being compounded with said cationic surfactant(s) in a ratio of 79–50% by weight to 21–50% by weight, provided that when the formula (I) anionic surfactant is used the cationic surfactant is a salt of

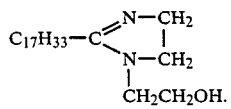

2. The combination of claim 1 wherein the cationic surfactant is one containing at least one quaternary nitrogen atom.

3. The combination of claim 1 wherein the cationic surfactant is one containing imidazoline ring.

4. The combination of claim 1 in which a defoaming agent is added in an amount of 5-50 parts by weight per 100 parts by weight of the total anionic and cationic surfactants.

5. The combination of claim 4 in which the defoaming agent is a silicone defoaming agent.

6. A process for promoting dewatering of granulated slag, which comprises contacting wet granulated slag with a slag dewatering composition in an aqueous medium under a neutral or alkaline condition of a pH 7 or higher, the slag dewatering composition having a reduced tendency to foam and comprising an ionic surfactant component, said ionic surfactant component consisting essentially of (a) one or more of anionic surfactants selected from the group consisting of those represented by the general formula $$C_{12}H_{25}O-(CH_2CH_2O)_n-SO_3M \qquad (I)$$

$$RCON+(CH_2CH_2O)_n-SO_3M, \qquad (II)$$
$$\quad\ \ \ |$$
$$\quad\ \ \ R'$$

and $$RCOOCH_2O-(CH_2CH_2O)_n-SO_3M \qquad (III)$$

wherein R denotes a monovalent hydrocarbon radical of $C_{11-30}$, R' denotes a hydrogen atom or a monovalent hydrocarbon radical of $C_{1-7}$, M denotes an inorganic cation of $H^+$, $Na^+$, $K^+$, $NH_4^+$, $\frac{1}{2}Mg^{2+}$ or $\frac{1}{2}Ca^{2+}$ and the mean value of n is 3-20, provided that for formula (I) n is 3, and (b) one or more of cationic surfactants selected from the group consisting of free bases represented by the general formula $$R-X \qquad (IV)$$

and their acid-addition salts, and compounds containing a quaternary nitrogen atom represented by the general formula $$(R-Y)^+G^- \qquad (V)$$

wherein R denotes a monovalent hydrocarbon radical of $C_{11-30}$, X denotes:

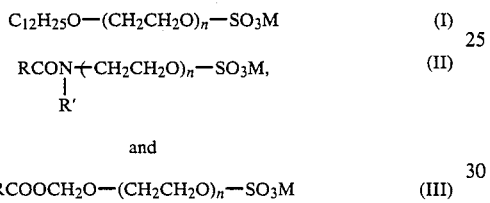

, and Y denotes:

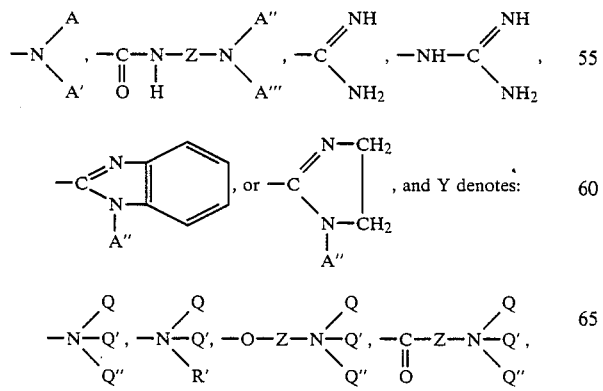

-continued

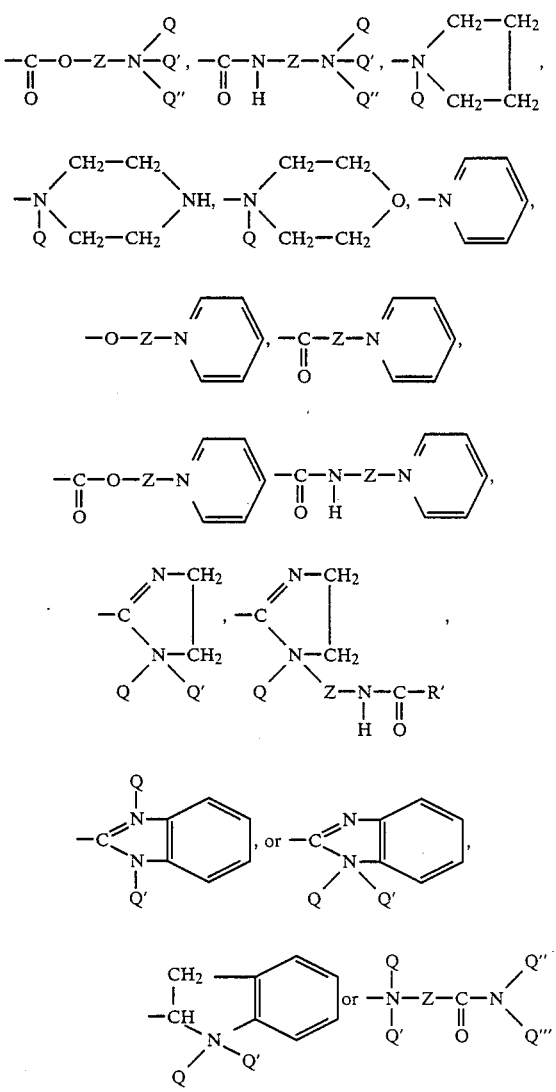

wherein A and A' may be identical with or different from each other and each denotes a hydrogen atom or a hydroxyalkyl group of $C_{1-4}$, A" and A'" may be identical to or different from each other and each denotes a hydrogen atom, a monovalent hydrocarbon radical of $C_{1-7}$, or a hydroxyalkyl group of $C_{1-4}$, Q, Q', Q" and Q'" may be identical with one another or not and each denotes a monovalent hydrocarbon radical of $C_{1-7}$ or a hydroxyalkyl group of $C_{1-4}$, R' denotes a monovalent hydrocarbon radical of $C_{1-30}$ which may be identical with or different from R, Z and Z' each denotes a divalent hydrocarbon radical of $C_{1-7}$ and may be identical with or different from each other, and G denotes a monovalent anion, said anionic surfactant(s) being compounded with said cationic surfactant(s) in a ratio of 79-50% by weight to 21-50% by weight, provide that when the formula (I) anionic surfactant is used the cationic surfactant is a salt of

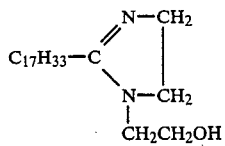

7. The process of claim 6 in which the treatment is conducted by adding the composition to the water wherein the granulated slag is dipped.

8. The process of claim 6 in which the treatment is conducted by adding the solution of the composition to the granulated slag.

9. The process of claim 6 in which the treatment is conducted by adding the composition to the aqueous medium used for breaking a fused slag to granulate.

10. The process of claim 6 in which granulated slag having a moisture content of 4% or less is obtained by spontaneous drying.

11. The process of claim 6 in which the anionic and cationic surfactants are used for treating in a total amount of 1–0.002% by weight per the weight in dryness of granulated slag to be treated.

* * * * *